United States Patent [19]

Hasselbacher

[11] 4,018,295

[45] Apr. 19, 1977

[54] VEHICLE EQUALIZER BAR MOUNTING MEANS

[75] Inventor: Roland E. Hasselbacher, Brimfield, Ill.

[73] Assignee: Caterpillar Tractor Co., Peoria, Ill.

[22] Filed: Nov. 14, 1975

[21] Appl. No.: 631,965

[52] U.S. Cl. .................................. 180/9.5; 305/31
[51] Int. Cl.² .......................................... B62D 55/00
[58] Field of Search ................ 180/9.5, 9.52, 9.54, 180/9.56, 9.58, 9.6; 305/31, 22

[56] References Cited

UNITED STATES PATENTS

| | | | |
|---|---|---|---|
| 1,297,291 | 3/1919 | Bowling | 180/9.54 |
| 1,395,021 | 10/1921 | Whitnall | 180/9.6 |
| 2,809,703 | 10/1957 | Hayes | 180/9.54 |

*Primary Examiner*—Philip Goodman
*Assistant Examiner*—John A. Pekar
*Attorney, Agent, or Firm*—Phillips, Moore, Weissenberger, Lempio & Majestic

[57] ABSTRACT

An equalizer bar is mounted on a track roller frame bearing by a split cap arrangement. The split is angled relative to a transverse axis of the vehicle, so that fastening means may be easily reached sidewardly of the track frame to disconnect the equalizer bar from such bearing means. In one preferred embodiment the equalizer bar main body, to which the cap is removably secured, overlies and is in contact with the bearing means to provide that, upon removal of the cap, the equalizer bar rests on the track roller frame.

15 Claims, 5 Drawing Figures

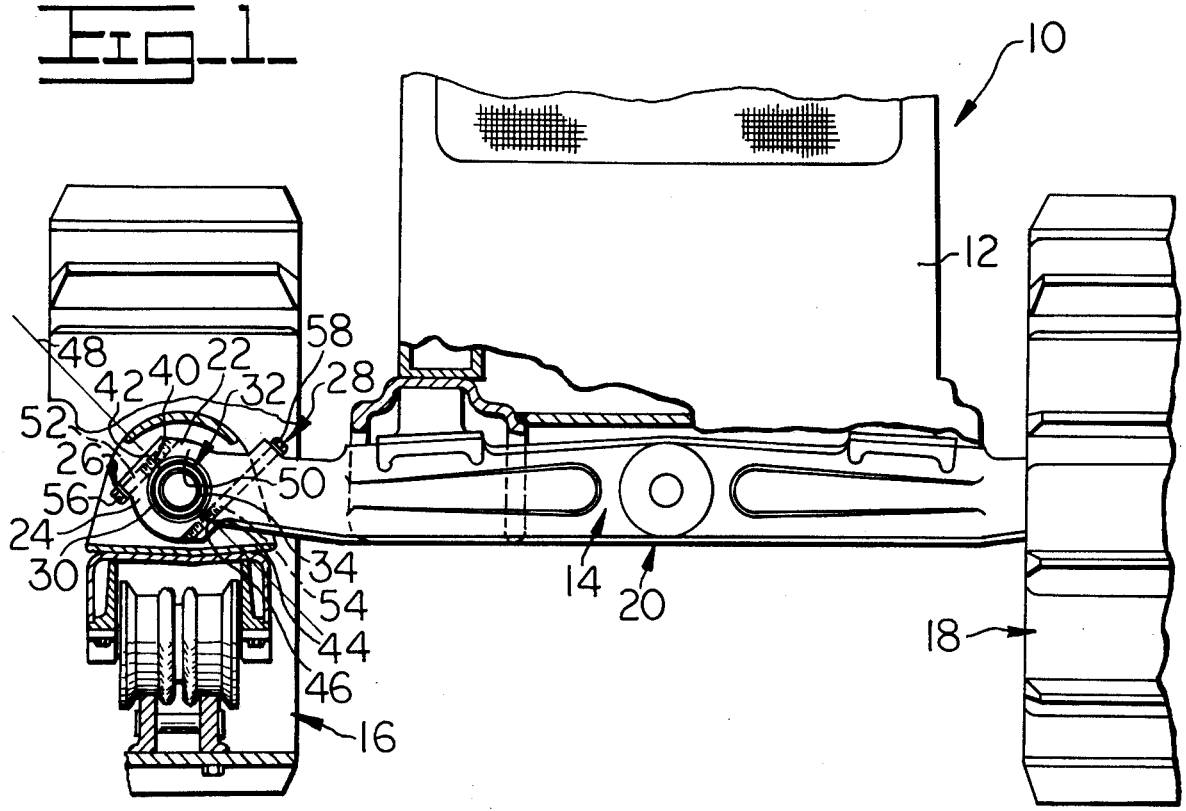
Fig_1
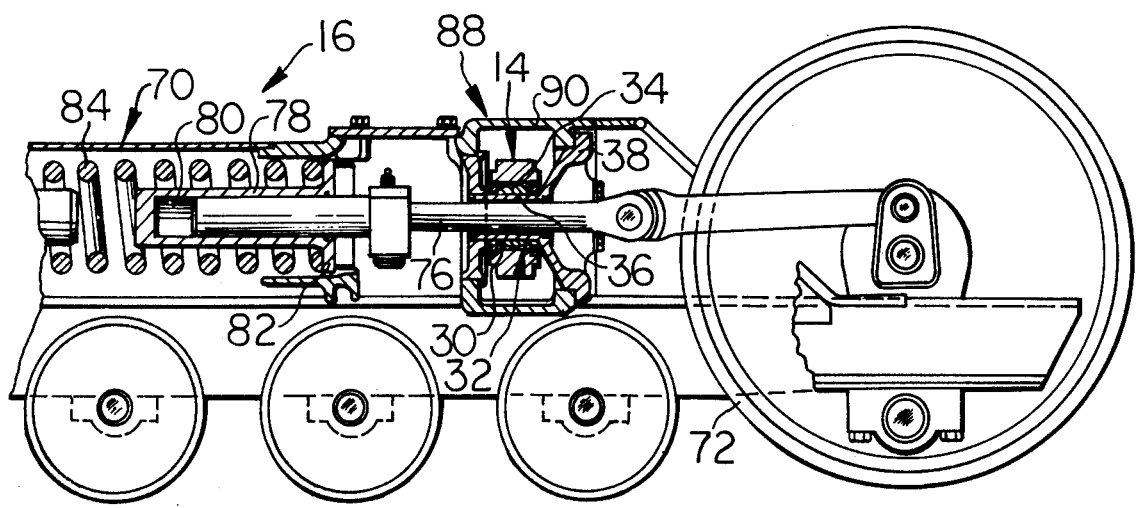
Fig_2

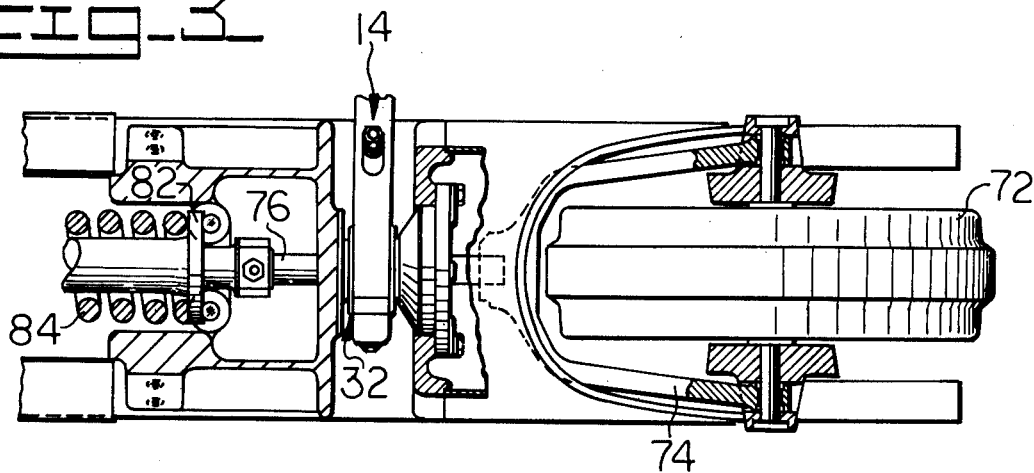
Fig_3
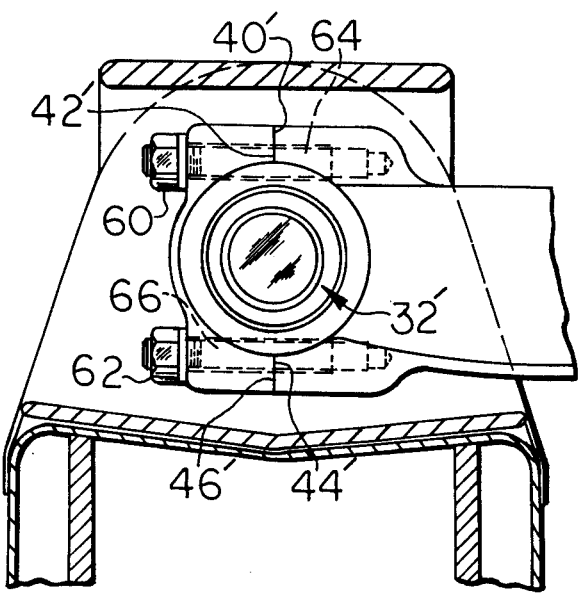
Fig_5

4,018,295

VEHICLE EQUALIZER BAR MOUNTING MEANS

BACKGROUND OF THE INVENTION

This invention relates to vehicle equalizer bar structure, and more particularly, to structure for interconnecting the ends of an equalizer bar with track roller frames of the vehicle.

In vehicles utilizing equalizer bars to support the front of the vehicle and to control spacing and tracking characteistics of the track roller frames thereof, various means for connecting the ends of the equalizer bar to the respective track roller frames have been utilized. In general, such means do not provide for relatively convenient disconnection of the ends of the equalizer bar from the respective track frames when so desired. In general, it is quite difficult to reach and disconnect the fastening means involved so as to allow separation of the equalizer bar and track roller frames.

SUMMARY OF THE INVENTION

It is accordingly an object of this invention to provide means for mounting the ends of an equalizer bar of a vehicle to respective track roller frames, which mounting means can be easily and conveniently reached to allow disconnection of the respective ends of the equalizer bar from such track roller frames.

It is a further object of this invention to provide means for mounting the ends of an equalizer bar to respective track roller frames which, while fulfilling the above object, allows, in one embodiment, that the vehicle need not be supported during the process of removal of the end caps associated with the equalizer bar from the ends of such equalizer bar.

It is a still further object of this invention to provide means for mounting the ends of an equalizer bar to respective track roller frames of the vehicle which, while fulfilling the above objects, allow for a degree of toe-in of the track roller frames relative to the vehicle upon oscillation of the track roller frames about their rear connections relative to the main frame.

It is a still further object of this invention to provide means for mounting the ends of an equalizer bar to respective track roller frames of a vehicle which, while fulfilling the above objects, is extremely simple in design and effective in use.

Broadly stated, the invention is in a vehicle having a main frame and a track frame, and comprises an equalizer bar interconnecting the main frame and track frame. The equalizer bar comprises a main body pivotally fixed to the main frame and defining a main body end portion. The equalizer bar further comprises an end cap removably secured to the main end body portion. Bearing means are mounted on the track frame, the main body end portion and end cap generally surrounding the bearing means when so secured together, so that the equalizer bar is pivotally connected to the track frame. The main body end portion defines a portion thereof overlying and in contact with the bearing means for providing that, upon removal of the end cap, the bearing means support the main body end portion and a portion of the weight of the frame transferred through the equalizer bar to the bearing means.

BRIEF DESCRIPTION OF THE DRAWINGS

These and other objects of the invention will become apparent from a study of the following specification and drawings, in which:

FIG. 1 is a front elevation, partially broken away, of a vehicle incorporating a first embodiment of the invention;

FIG. 2 is a sectional side elevation of the inventive mounting means of FIG. 1;

FIG. 3 is a plan view, with portions removed, of the apparatus as shown in FIG. 2;

FIG. 5 is a front elevation of a second embodiment of mounting means.

DESCRIPTION OF THE PREFERRED EMBODIMENT

Figure 4:
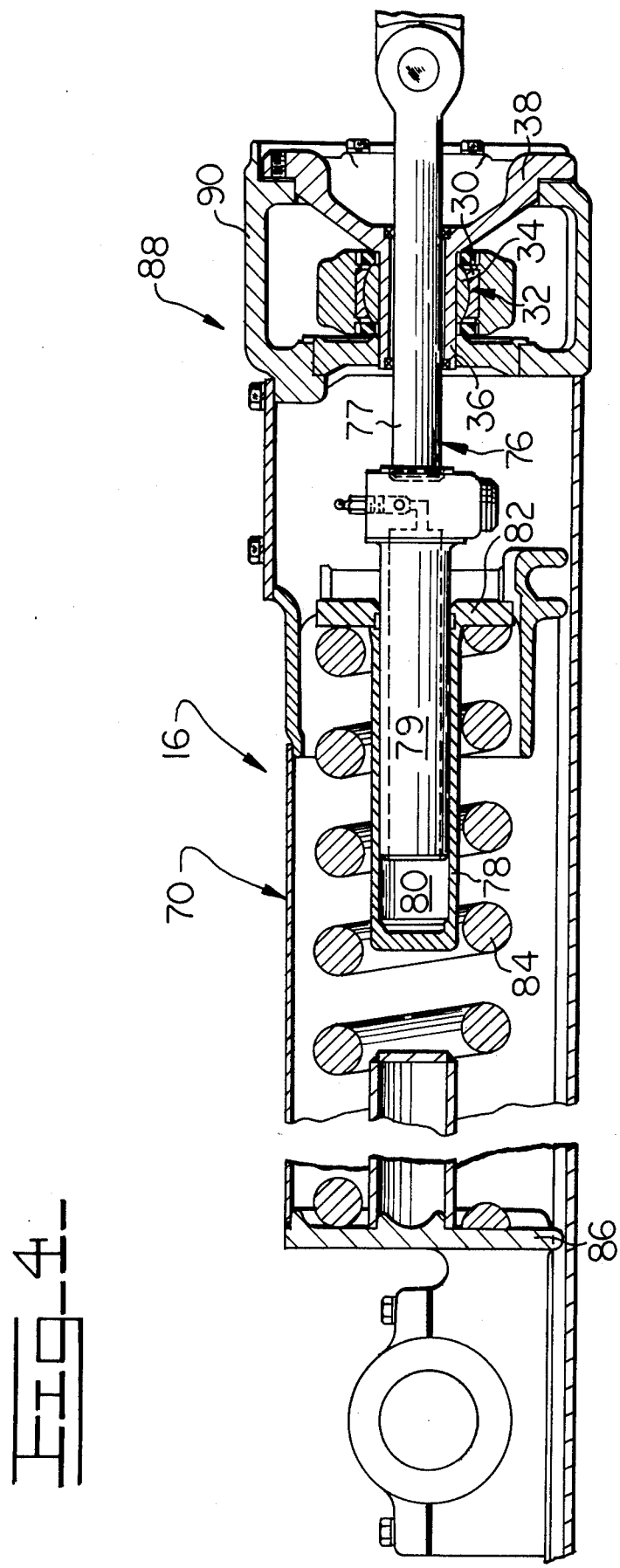
FIG. 4 is an enlarged view of a portion of the structure shown in FIG. 2.

Shown in FIG. 1 is a vehicle 10 having main frame 12 to which an equalizer bar 14 is substantially at its midpoint, and the equalizer bar 14 is positioned generally transversely of the vehicle 10. The vehicle 10 includes track roller frames 16,18 disposed on either side thereof. Each end of the equalizer bar 14 is associated with a track roller frame in a similar manner and consequently, only one connection will be described in detail.

The equalizer bar 14 is made up of a main body 20 which is pivotally fixed to the main frame 12, and which defines a main body end portion 22. An end cap 24 is associated with the main body end portion 22, and the end cap 24 may be removably secured to the main body end portion 22 by a pair of bolts 26,28. With the main body end portion 22 and end cap 24 secured together by means off such bolts 26,28, such main body end portion 22 and end cap 24 generally surround the outer race 30 of a spherical bearing 32, as shown best in FIG. 4. The inner race 34 on the spherical bearing 32 is mounted on a tubular portion 36 defined by a body 38 which makes up part of the track roller frame 16.

With the main body end portion 22 and end cap 24 so secured together, the end portion 22 and end cap 24 define respective contacting surfaces 40,42,44,46 on either side of the bearing 32. As shown in FIG. 1, such surfaces 40,42, 44,46 are substantially aligned along a line 48, and such line 48, and such line 48 lies substantially 45° from a transverse axis on the vehicle 10. By so positioning the surfaces 40,42,44,46 it is insured that the main body end portion 22 defines a portion 50 which overlies and is in contatct with the bearing 32 for providing that, upon removal of the end cap 24, the bearing 32, and thus the track roller frame 16, supports the main body end portion 22 of the equalizer bar 14 and a portion of the weight of the frame 12 transferred through the equalizer bar 14, to the bearing 32. It is thus clear that the frame 12 of the vehicle 10 need not be supported for removal of the end cap 24.

The bolts 26,28 as shown in place are disposed on either side of the bearing 32. The threaded shaft 52 of bolt 26 has its longitudinal axis disposed perpendicular to the substantially aligned contacting surfaces 40,42, and the threaded shaft 54 of bolt 28 also has its longitudinal axis disposed substantially perpendicular to the substantially aligned contacting surfaces 44,46. The particular positioning of such threaded shafts 52,54 of the bolts 26,28 results in the fact that such longitudinal axes of the respective threaded shafts 52,54 are also positioned substantially 45° from a transverse axis of the vehicle 10. The outer bolt 26 is positioned so that its head 56 is lower than its threaded shaft 52, and the inner bolt 28 is disposed with its head 58 higher than its threaded shaft 54, as shown in FIG. 1. Rotating the heads 56,58 of the bolts 26,28 in one and the other respective directions provides for fastening of the end cap 24 to the main body end portion 22, and removal of the end cap 24 from the main body end portion 22.

Because of the particular placement and angling of such bolts 26,28, and the positions of the heads 56,58 thereof, it will be seen that such heads 56,58 can easily and conveniently be reached by workmen for removal thereof by rotation of such heads 56,58, to allow the end cap 24 to be removed, so that the track roller frame 16 can be relatively easily removed from the vehicle 10. In fact, it has been found desirable to position the contacting surfaces 40,42,44,46 along a line within the limits of from 30° to 90° from a transverse axis of the vehicle, which in turn allows for positioning of the fastening means 26,28 so that the means which must be rotated to allow disconnection of the end cap 24 can be easily and conveniently reached. For example, in the embodiment of FIG. 5, the contacting surfaces 40',42',44',46' lie along a line which is substantially 90° from a transverse axis of the vehicle 10. Threaded shafts 64,66 are disposed on either side of the spherical bearing 32', with the nuts 60,62 associated therewith being disposed outwardly of the threaded shafts 64,66 thereof relative to the vehicle 10. With such placement of the contacting surfaces 40',42',44',46', the nuts 60,62 disposed directly outwardly of the contacting surfaces 40',42',44',46', may be removed from threaded shafts 64,66, each of which has its longitudinal axis disposed substantially perpendicular to the substantially aligned surfaces 40',42',44',46'.

As is of course well known, the rear portion of the track roller frame 16 is connected to the vehicle 10 so as to be pivotable about an axis transverse of the vehicle 10. The spherical bearing 32 utilized allows for a slight degree of misalignment which would occur when the machine is being operated over uneven terrain, resulting in pivoting of such track roller frame 16 and the equalizer bar 14.

As noted in FIG. 1, the equalizer bar-track roller frame pivot axis is positioned substantially along the vertical center line of the track roller frame 16. Such positioning results in the fact that the vertical force applied to the track roller frame 16 from the ground does not induce a turning moment of the track roller frame 16 about the pivot axis of the spherical bearing 32, which would be the case if such spherical bearing 32 were to be placed inward or outward of such vertical center line of the track frame 16.

The track roller frame 16 includes recoil means 70 best shown in FIGS. 2, 3 and 4 comprising an idler 72 having a yoke 74 associated therewith, and a push rod assembly 76 pivotally fixed to and extending rearwardly of the vehicle 10 from the yoke 74. The push rod assembly 76 is actually made up of a push rod portion 77 and a push rod portion 79 bearing thereagainst as shown in FIG. 4. The push rod assembly 76 extends through the bore of the tubular portion 36 and the bore defined by the inner race 34 of the bearing 32, mounted on such tubular portion 36 as shown. The push rod 76 extends into a tubular member 78 closed at one end thereof, and defining a chamber 80 with the end of the push rod 76. Such chamber 80 is filled with substantially incompressible fluid such as grease, as is well known. The tubular member 78 defines a flange portion 82, and a resilient helical spring 84 is disposed between the flange portion 82 and a reaction member 86 fixed relative to the track roller frame 16. It will be seen that the resilient spring 84 resiliently resists recoil movement of the idler 72 and push rod 76.

In the structure thus described, the assembly 88, including body 38, outer member 90 to which such body 38 is mounted, and bearing 32, may be preassembled and secured to the remaining portion of the track roller frame 16. The particular structure described results in a highly efficiently operable placement of the reciprocable push rod 76, meanwhile also providing effective mounting of the spherical bearing 32 with which the end of the equalizer bar 14 is associated. That is, the body 38 which is a part of the assembly 88 not only has bearing 32 mounted on tubular portion 36, but also such tubular portion 36 acts as a guide for reciprocal movement of the push rod 76. The other end of the equalizer bar 14 is associated with the track roller frame 18 in a like manner, and includes placement of a push rod and recoil means similar to that described herein.

What is claimed is:
1. In a vehicle having a main frame and a track frame;
    an equalizer bar comprising a main body pivotally fixed to the main frame and defining a main body end portion;
    said equalizer bar further comprising an end cap removably secured to the main body end portion;
    bearing means mounted to said track frame, the main body end portion and end cap generally surrounding the bearing means when so secured together, so that the equalizer bar is pivotally connected to the track frame;
    the main body end portion defining a portion thereof overlying and in contact with the bearing means for providing that, upon removal of the end cap, the bearing means support the main body end portion and a portion of the weight of the main frame transferred through the equalizer bar to the bearing means,
    Wherein the equalizer bar is positioned generally transversely of the vehicle, and wherein the main body end portion and end cap define contacting surfaces on either side of the bearing means when so secured together, said contacting surfaces being substantially aligned and being disposed along a line substantially 45° from a transverse axis of the vehicle.

2. The apparatus of claim 1 and means for selectively securing the end cap to the main body end portion comprising a pair of threaded shafts, each shaft having its longitudinal axis disposed substantially perpendicular to the substantially aligned surfaces, and means associated with each shaft and rotatable in one direction to draw the main body end portion and end cap together, and rotatable in the other direction to allow the main body end portion and end cap to be drawn apart.

3. The apparatus of claim 2 wherein the means for selectively securing the end cap to the main body end portion comprise a pair of bolts, the threaded shafts thereof comprising said threaded shafts, the heads thereof comprising said means rotatable in one and the other directions.

4. The apparatus of claim 3 wherein the bolts are disposed on either side of the bearing means, with the outer bolt being disposed with its head lower than its shaft, and the inner bolt disposed with its head higher than its shaft.

5. In a vehicle having a main frame and a track frame;

an equalizer bar interconnecting the main frame and track frame;

said equalizer bar comprising a main body pivotally fixed to the main frame and defining a main body end portion;

said equalizer bar further comprising an end cap removably secured to the main body end portion;

bearing means mounted to said track frame, the main body end portion and end cap generally surrounding the bearing means when so secured together, so that the equalizer bar is pivotally connected to the track frame;

the main body end portion and end cap defining contacting surfaces on either side of the bearing means when so secured together, said contacting surfaces being substantially aligned, with the contacting surfaces inward of the bearing means being disposed lower than the contacting surfaces outward of the bearing means;

the contacting surfaces being disposed along a line within the limits of from 30° to 90° from a transverse axis of the vehicle.

6. The apparatus of claim 5 wherein the contacting surfaces are disposed substantially 90° from a transverse axis of the vehicle.

7. The apparatus of claim 6 and means for selectively securing the end cap to the main body portion end comprising a pair of threaded shafts, each having its longitudinal axis disposed substantially perpendicular to the substantially aligned surfaces, and means associated with each shaft and rotatable in one direction to draw the main body end portion and end cap together, and rotatable in the other direction to allow the main body end portion and end cap to be drawn apart.

8. The apparatus of claim 7 wherein the shafts are disposed on either side of the bearing means, with the rotatable means associated therewith being disposed outwardly of the shafts thereof relative to the vehicle.

9. The apparatus of claim 8 wherein the bearing means comprise spherical bearing means.

10. In a vehicle having a main frame and a track frame;

an equalizer bar comprising a main body pivotally fixed to the main frame and defining a main body end portion;

said equalizer bar further comprising an end cap removably secured to the main body end portion;

bearing means mounted to said track frame, the main frame body end portion and end cap generally surrounding the bearing means when so secured together, so that the equalizer bar is pivotally connected to the track frame;

the main body end portion defining a portion thereof overlying and in contact with the bearing means for providing that, upon removal of the end cap, the bearing means support the main body end portion and a portion of the weight of the main frame transferred through the equalizer bar to the bearing means, and further comprising recoil means associated with the track frame and comprising push rod means extending rearwardly of the vehicle, the bearing means defining a bore through which the push rod means extend, and resilient means associated with the push rod means and track frame for resiliently resisting recoil movement of the push rod means.

11. The apparatus of claim 10 wherein the bearing means comprise spherical bearing means the inner race of which defines said bore through which the push rod means extend.

12. The apparatus of claim 11 wherein the track frame defines a tubular portion on which said inner race is mounted, the push rod means extending through the bore of the tubular portion and the bore defined by the inner race.

13. In a vehicle having a main frame and a track frame;

an equalizer bar interconnecting the main frame and track frame;

the equalizer bar being pivotally connected to the main frame;

bearing means mounted to the track frame, and end of the equalizer bar being pivotally connected to the bearing means;

recoil means associated with the track frame, and comprising push rod means extending rearwardly of the vehicle, the bearing means defining a bore through which the push rod means extend, and resilient means associated with the push rod means and track frame for resiliently resisting recoil movement of the push rod means.

14. The apparatus of claim 13 wherein the bearing means comprise spherical bearing means the inner race of which defines said bore through which the push rod means extend.

15. The apparatus of claim 14 wherein the track frame defines a tubular portion on which said inner race is mounted, the push rod means extending through the bore of the tubular portion and the bore defined by the inner race.

* * * * *